(12) United States Patent
Totsuka

(10) Patent No.: US 6,562,446 B1
(45) Date of Patent: *May 13, 2003

(54) MULTI-LAYER POLYMER ELECTROLYTE-MEMBRANE, ELECTROCHEMICAL APPARATUS AND PROCESS FOR THE PREPARATION OF MULTI-LAYER POLYMER ELECTROLYTE MEMBRANE

(75) Inventor: Kazuhide Totsuka, Kyoto (JP)

(73) Assignee: Japan Storage Battery Co., Ltd., Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/369,143

(22) Filed: Oct. 20, 1999

(30) Foreign Application Priority Data

Aug. 5, 1998 (JP) .......................................... 10-234946
Aug. 5, 1998 (JP) .......................................... 10-234947

(51) Int. Cl.$^7$ ................................................. B32B 3/26
(52) U.S. Cl. ................................ 428/304.4; 428/308.4; 428/315.5; 428/319.3; 428/319.9; 428/421; 204/296; 204/252; 429/30; 429/33; 429/40; 429/42; 429/44; 210/500.36

(58) Field of Search ................................. 204/296, 252; 429/30, 33, 40, 42, 44; 428/304.4, 308.4, 315.5, 319.3, 319.9, 421; 210/500.36

(56) References Cited

U.S. PATENT DOCUMENTS

| | | | |
|---|---|---|---|
| 5,094,895 A | * 3/1992 | Branca et al. | ........... 428/36.91 |
| 5,219,682 A | * 6/1993 | Bones et al. | ................. 429/193 |
| 6,130,175 A | * 10/2000 | Rusch et al. | ................... 442/77 |
| 6,254,978 B1 | * 7/2001 | Bahar et al. | ............. 428/305.5 |

OTHER PUBLICATIONS

Nafion perfluorinated polymer products, DuPont, 4 pages.*

* cited by examiner

Primary Examiner—Terrel Morris
Assistant Examiner—Hai Vo
(74) Attorney, Agent, or Firm—Sughrue Mion, PLLC (57) ABSTRACT

A multi-layer polymer electrolyte membrane having a polymer electrolyte layer and a porous polymer electrolyte layer with three dimensional network pores on the former polymer electrolyte layer is provided. The polymer electrolyte layer can be provided on both sides of the porous polymer electrolyte layer. An electrochemical apparatus and a solid polymer electrolyte type fuel cell made of the multi-layer polymer electrolyte membrane can be provided. Further, a solid polymer electrolyte type fuel cell having the multi-layer polymer electrolyte membrane can be provided. Further, a process for the preparation of the multi-layer polymer electrolyte membrane can be provided.

9 Claims, 7 Drawing Sheets

MULTI-LAYER POLYMER ELECTROLYTE-MEMBRANE, ELECTROCHEMICAL APPARATUS AND PROCESS FOR THE PREPARATION OF MULTI-LAYER POLYMER ELECTROLYTE MEMBRANE

BACKGROUND OF THE INVENTION

1. Field of the Invention

The present invention relates to a multi-layer polymer electrolyte membrane, an electrochemical apparatus and a process for the preparation of a multi-layer polymer electrolyte membrane.

2. Description of the Related Art

As examples of an electrochemical apparatus including polymer electrolyte membrane, there are solid polymer electrolyte type fuel cell, direct methanol type fuel cell, water and chloro-alkali electrolyzer, ozonizer utilizing these mechanisms, oxygen separator, hydrogen separator, and oxygen sensor.

Such electrochemical apparatuses have a polymer electrolyte membrane which acts as an electrolyte and electrodes which act as anode and cathode, respectively, on the respective surfaces of the polymer electrolyte membrane. The polymer electrolyte membrane and these electrodes may or may not be assembled to each other. In such electrochemical apparatuses, reaction materials react at the cathode and the anode, electrochemically. In this reaction, ions conduct through the polymer electrolyte membrane while electrons conduct through the external circuit.

In the solid polymer electrolyte type fuel cell, for example, oxygen is supplied as a cathode reaction material while hydrogen is supplied as an anode reaction material, so that electric power is given to the external circuit. In the direct methanol type fuel cell, oxygen is supplied as catholyte while a mixture of methanol and water is supplied as anolyte.

Referring to the structure of such an electrochemical apparatus, an electrode having a catalyst layer and a diffusion layer is assembly D on both surfaces of a polymer electrolyte membrane, so that the catalyst layer comes into contact with the polymer electrolyte membrane. The laminate is disposed interposed between a pair of gas-impermeable separators each having a gas flow ditch formed therein to form a single cell as basic unit. A plurality of these single cells are assembly D to form the electrochemical apparatus.

The catalyst layer is comprised of a catalyst such as particulate platinum group metal catalyst and carbon powder having a particulate platinum group metal supported thereon, optionally having a polymer electrolyte added therein. The diffusion layer of the assembly is comprised of an electrically conductive substrate having a high fluid transmission such as hydrophobic carbon paper.

As the foregoing binder there may be normally used a fluororesin such as polytetrafluoroethylene (PTFE). Such a fluororesin acts also as a hydrophobe for rendering the catalyst layer properly hydrophobicity.

In such an electrochemical apparatus having a polymer electrolyte membrane, electrochemical reaction proceeds at the interface between the electrode which acts as a cathode or anode and the polymer electrolyte membrane. Thus, increasing of the interfacial area between the electrode and the polymer electrolyte membrane needs to be as great as possible for the purpose of enhancing the efficiency of the electrochemical apparatus.

To this object such as increasing of the interfacial area, various processes to form the roughening on the surface of a polymer electrolyte membrane have been proposed. For example, JP-A-3-158486 (The term "JP-A" as used herein means an "Unexamined Japanese Patent Publication") discloses a process involving the use of roughened rolls. JP-A-4-169069 discloses a process involving sputtering. JP-A-4-220957 discloses a process involving plasma etching. JP-A-6-279600 discloses a process including embedding a cloth on a polymer electrolyte membrane, and then peeling the cloth off the polymer electrolyte membrane.

To the same aim, a process involving the formation of the pores in the surface of a polymer electrolyte membrane has been proposed. For example, JP-A-58-7432 discloses a process which has crystallizing the dispersion medium having a polymer electrolyte membrane dissolved therein into droplets which are then removed. JP-A-62-146926 discloses a process which has dispersing particles in a polymer electrolyte membrane, and then removing the particles. JP-A-5-194764 discloses a process which has mixing a polymer electrolyte membrane with a low molecular organic material, and then removing the low molecular organic material.

The polymer electrolyte membrane) having such electrochemical apparatuses is a polymer membrane which exhibits ionic conductivity. The polymer electrolyte membranes, e.g. perfluorosulfonic acid resin membrane, which is an ion exchange resin membrane exhibits proton conductivity in hydrous state. However, it exhibits a decrease of proton conduction with a decrease of water content and exhibits no proton conduction when dried. On the other hand, in the solid polymer electrolyte type fuel cell, etc., proton generated at the anode is conducted with a few hyrorate water molecules through the polymer electrolyte membrane to the cathode, where they react with oxygen to produce water.

Thus, in such an electrochemical apparatus, the water content of the polymer electrolyte membrane at the anode due to permeation of hydorate water and the proton conduction of polymer electrolyte membrane decrease. Accordingly, it is necessary that the water content of the polymer electrolyte membrane be kept high to keep the function of the polymer electrolyte membrane sufficient. To this aim, various proposals have been made.

These proposals are a process which has supplying a humidified fuel gas into the anode in order to supply water into the polymer electrolyte membrane; a process which has reducing the thickness of the polymer electrolyte membrane so that the effect of back diffusion of water caused the gradient of water content between the anode and the cathode is accelerated, whereby the polymer electrolyte membrane is supplied with water; a process which has allowing one end or a part of the polymer electrolyte membrane to come in contact with water to supply water into the polymer electrolyte membrane with water; a process which has allowing fibers or other hygroscopic materials embedded in the polymer electrolyte membrane to come in contact with water at one end thereof, to supply water into the polymer electrolyte membrane with water; a process which has dispersing fine particles of titanium dioxide or the like in the polymer electrolyte membrane to enhance the water retention thereof; and a process which has dispersing fine particles of platinum in the polymer electrolyte membrane so that oxygen and hydrogen permeated through the polymer electrolyte membrane produce water.

The conventional process which has roughening the surface of the polymer electrolyte membrane to increase the contact area is disadvantageous in that the resulting roughness is too large to sufficiently increase the area of contact between the polymer electrolyte membrane and the electrode.

Further, the conventional process which has forming pores in the surface of the polymer electrolyte membrane to increase the contact area is disadvantageous in that the dispersion medium, particles, low molecular organic material, etc. can hardly be completely removed. Thus, the resulting residues prevent the contact of the polymer electrolyte membrane with the electrode or ionic conduction. Further, heating or solvent treatment at the removal step causes the deterioration of the polymer electrolyte membrane that and the reduction of the ionic conduction.

Moreover, the conventional process which has keeping the water content of the polymer electrolyte membrane high has various disadvantages. For example, the process involving the reduction of the thickness of the polymer electrolyte membrane is disadvantageous in that the strength of the polymer electrolyte membrane is lowered. The process which has allowing the polymer electrolyte membrane to come in contact with water and the process involving the utilization of wick are disadvantageous in that a sufficient water retention cannot be obtained. The process involving the dispersion of titanium dioxide or platinum is disadvantageous in that the use of the expensive metal adds to the production cost.

SUMMARY OF THE INVENTION

It is an object of the present invention to solve the foregoing conventional problems and hence allow the production of a high-performance electrochemical apparatus.

According to a first aspect of the present invention, a multi-layer polymer electrolyte membrane has a polymer electrolyte layer and a porous polymer electrolyte layer with three-dimensioned network pores on the former polymer electrolyte layer.

According to a second aspect of the present invention, in the multi-layer polymer electrolyte membrane as defined in the first aspect, the polymer electrolyte layers are provided on both side of the porous polymer electrolyte layer with three-dimensional network pores.

According to a third aspect of the present invention, an electrochemical apparatus has a multi-layer polymer electrolyte membrane as defined in the first or second aspect of the present invention provided interposed between electrodes.

According to a fourth aspect of the present invention, a solid polymer electrolyte type fuel cell has a multi-layer polymer electrolyte membrane as defined in the second aspect of the present invention provided interposed between electrodes.

According to a fifth aspect of the present invention, a process for the preparation of a multi-layer polymer electrolyte membrane having a polymer electrolyte layer and a porous polymer electrolyte layer with three-dimensional network pores formed thereon, has the steps of applying a solution of a polymer electrolyte in a solvent containing an alcohol to a polymer electrolyte layer, and then dipping the polymer electrolyte layer to which the solution has been applied in an organic solvent having a polar group other than alcoholic hydroxyl group.

DETAILED DESCRIPTION OF THE INVENTION

The present invention will be described as follows referring to the accompanying drawings.

A multi-layer polymer electrolyte membrane according to the present invention has a polymer electrolyte layer and a porous polymer electrolyte layer with three-dimensional network pores (hereinafter referred to as "porous polymer electrolyte layer") formed on the former polymer electrolyte layer. The multi-layer polymer electrolyte membrane may have various structures such as a two-layer structure having a polymer electrolyte layer and a porous polymer electrolyte layer; a three-layer structure having a polymer electrolyte layer and two porous polymer electrolyte layers provided on the respective surface of the polymer electrolyte layer; a three-layer structure having a porous polymer electrolyte layer and two polymer electrolyte layer provided on the respective surface of the porous polymer electrolyte layer; a five-layer structure having a porous polymer electrolyte layer, two polymer electrolyte layers provided on the respective surface of the porous polymer electrolyte layer, and two porous polymer electrolyte layers provided on the respective polymer electrolyte layer; a structure having a plurality of porous polymer electrolyte layers or polymer electrolyte layers having different structures; and a structure having a non-film-like porous polymer electrolyte layer.

Figure 1:
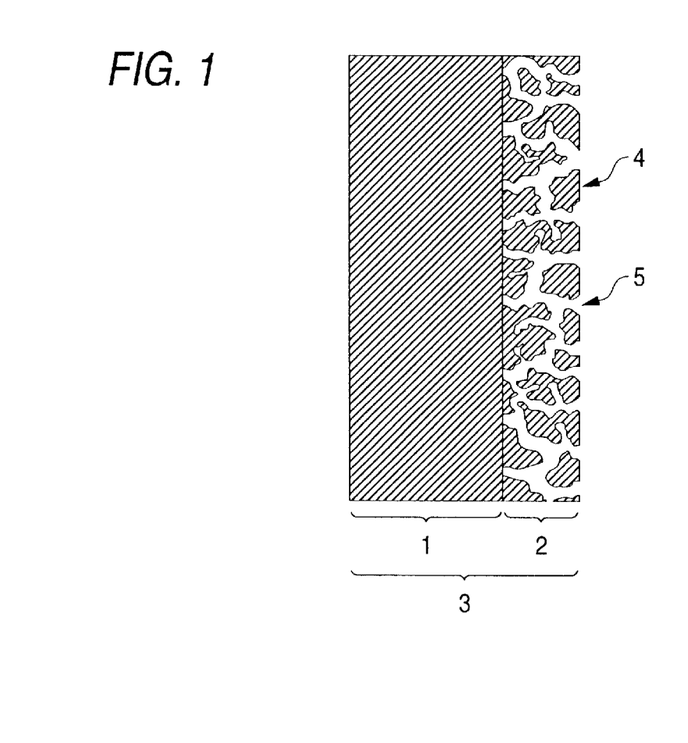
FIG. 1 is a schematic sectional view illustrating an embodiment of the multi-layer polymer electrolyte membrane according to the present invention.

FIG. 1 is a schematic sectional view illustrating an embodiment of the multi-layer polymer electrolyte membrane according to the present invention. In FIG. 1, a reference numeral 1 indicates a conventional polymer electrolyte film having no pores formed therein. A reference numeral 2 indicates a porous polymer electrolyte layer. A reference numeral 3 indicates a multi-layer polymer electrolyte membrane according to the present invention. A reference numeral 4 indicates the polymer electrolyte portion of the porous polymer electrolyte layer 2. A reference numeral 5 indicates the pore portion of the porous polymer electrolyte layer 2. The polymer electrolyte portion 4 has a three-dimensionally networked skeleton structure having electrolytes communicated to each other. The pore portion 5 have three-dimensionally communicating pores with one another.

As shown in FIG. 1, the multi-layer polymer electrolyte membrane according to the present invention has a porous polymer electrolyte layer having with three-dimensional network pores. Therefore, if the porous polymer electrolyte layer is disposed at the surface of the polymer electrolyte layer, the resulting multi-layer polymer electrolyte membrane can be provided with a remarkably high surface area. In this arrangement, if the porous polymer electrolyte layer is disposed in contact with an electrode, the area of contact between the porous polymer electrolyte layer and the electrode can be increased. If the porous polymer electrolyte layer is disposed in contact with a catalyst layer, the area of contact between the porous polymer electrolyte layer and the catalyst layer can be increased. Accordingly, the area of three-phase interface where the electrolyte, the catalyst and the reactant needed for electrode reaction in an electrochemical apparatus such as fuel cell can be increased. And it is possible to enhance the efficiency of the electrochemical apparatus.

Further, since the porous polymer electrolyte layer has a high surface area, the area of contact with water is increased, it can smoothly take water into the multi-layer polymer electrolyte membrane. Accordingly, the multi-layer polymer electrolyte membrane can be retained enough water therein. The porous polymer electrolyte layer has a large number of pores and has suitable hydrophilicty. Thus, since much water can be retained in thee pores, the water content of the multi-layer polymer electrolyte membrane can be increased as well.

Moreover, the porous polymer electrolyte layer has three-dimensional network pores. Thus, the use of the multi-layer polymer electrolyte membrane according to the present invention in an electrochemical apparatus allows smooth diffusion of reactants taking part in the electrode reaction such as cathode reactant, anode reactant or substances produced by the electrode reaction and smooth supply of water required to humidified the multi-layer polymer electrolyte membrane.

Further, since the porous polymer electrolyte layer has three-dimensional network pores and hence a three-dimensionally networked skeleton structure having electrolytes communicated to each other, a path of proton conduction can be formed continually. Thus, the arrangement of the porous polymer electrolyte layer does not cause the drop of protonic conductivity. Since it is easy to keep the water content of the multi-layer polymer electrolyte membrane high and hence making it possible to secure a good protonic conductivity.

Figure 2:
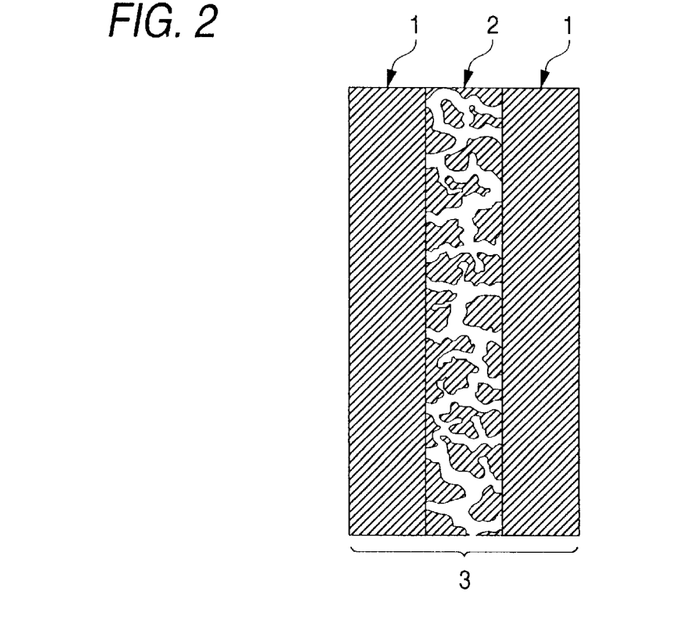
FIG. 2 is a schematic sectional view illustrating another embodiment of the multi-layer polymer electrolyte membrane according to the present invention.

FIG. 2 is a schematic sectional view illustrating another embodiment of the multi-layer polymer electrolyte membrane according to the present invention. In FIG. 2, the reference numeral 1 indicates a conventional non-porous polymer electrolyte layer. The reference numeral 2 indicates a porous polymer electrolyte layer. The reference numeral 3 indicates the multi-layer polymer electrolyte membrane according to the present invention.

Thus, a polymer electrolyte layer is arranged on both surfaces of a porous polymer electrolyte layer. The water retention of, particularly, the multi-layer polymer electrolyte membrane can be improved, and it is possible to keep the water content of the multi-layer polymer electrolyte membrane high.

The multi-layer polymer electrolyte membrane of the present invention having the foregoing characteristics can be used as a multi-layer polymer electrolyte membrane of an electrochemical apparatus such as solid polymer electrolyte type fuel cell, direct methanol type fuel cell, water electrolyzer, brine electrolyzer, ozonizer, oxygen separator, hydrogen separator and oxygen sensor. The multi-layer polymer electrolyte membrane can be worked by arrangement of an electrode on both surfaces, and hence makes it possible to improve the performance of these apparatuses.

The multi-layer polymer electrolyte membrane according to the present invention can be prepared by various processes. An appropriate process for the preparation of the multi-layer polymer electrolyte membrane according to the present invention is applying a solution of a polymer electrolyte containing an alcohol in a solvent to a polymer electrolyte layer, and then immersing the polymer electrolyte layer to which the solution has been applied in an organic solvent having a polar group other than alcoholic hydroxyl group. Further, the porous polymer electrolyte layer prepared by this process is advantageous in function such as improvement of contact area with an electrode and water retention therein.

The foregoing preparation process will be further described hereinafter.

The porous polymer electrolyte layer can be prepared by adjusting the concentration of a solution of a polymer electrolyte containing an alcohol in a solvent, applying the solution to a multi-layer polymer electrolyte layer in stratum, and then immersing the polymer electrolyte layer in an organic solvent having a polar group other than alcoholic hydroxyl group.

As the solution of a polymer electrolyte containing an alcohol in a solvent there may be used, e.g., 5 wt % Nafion solution (produced by Aldrich Corp. of US), which is a commercially available perfluorosulfonic acid resin solution.

This Nafion solution can be diluted, concentrated or otherwise adjusted in concentration to prepare Nafion solutions having various concentrations. The adjustment of the concentration of the Nafion solution can be accomplished by diluting the polymer electrolyte solution with an alcohol, water or mixture thereof or by concentrating the polymer electrolyte solution so that the solvent is partially removed by means of heating. The solution of a polymer electrolyte containing an alcohol in a solvent (hereinafter referred to as "polymer electrolyte solution") is preferably a perfluorosulfonic acid resin solution.

As the polymer electrolyte layer, there may be used a polymer membrane which exhibits proton conduction in hydrous state such as perfluorosulfonic acid membrane (e.g., Nafion 115 membrane (trade name, produced by Du Pont (This membrane is free of pores)), which is a commercially available perfluorosulfonic acid resin membrane), fluorocarbon multi-layer polymer electrolyte membrane (e.g., perfluorocarboxylic acid membrane) and hydrocarbon multi-layer polymer electrolyte membrane (e.g., styrene vinylbenzene sulfonic acid membrane). Preferred among these multi-layer polymer electrolyte membranes are fluorine-based multi-layer polymer electrolyte membranes such as perfluorosulfonic acid membrane and perfluorocarboxylic acid membrane from the standpoint of heat resistance and chemical stability. Further, a polymer electrolyte layer having a sulfonic acid group is desirable because it exhibits a high proton conduction.

Referring to the application, in case of using a polymer electrolyte membrane such as Nafion 115 for polymer electrolyte layer, the membrane is boiled in purified water for 1 hour so that it is hydrous. Subsequently, a polymer electrolyte solution such as 5 wt % Nafion solution is applied to the membrane. If a polymer electrolyte layer is a polymer electrolyte membrane such as Nafion 115, the polymer electrolyte layer may be immersed in an alcohol such as ethanol so that it swells further to facilitate the application of the polymer electrolyte solution. In this case, the swollen polymer electrolyte layer is wiped to remove excessive alcohol from the surface thereof. The polymer electrolyte solution is then spray-coated onto or otherwise applied to the surface of the polymer electrolyte layer.

Subsequently, the polymer electrolyte layer to which the polymer electrolyte solution has been applied is immersed in an organic solvent having a polar group other than alcoholic hydroxyl group. The polymer electrolyte layer is taken out from the organic solvent, and then dried to form a porous polymer electrolyte layer is formed on the surface of the polymer electrolyte layer.

The application of the polymer electrolyte solution to the polymer electrolyte layer can be accomplished by any appropriate method such as doctor blade coating method and screen printing method besides spray coating method.

In order to facilitate the application of the polymer electrolyte solution, as the alcohol in which the polymer electrolyte layer is immersed there may be used ethanol or methanol, 1-propanol, 2-propanol, 1-butanol or 2-butanol, which has four or less carbon numbers.

As the organic solvent having a polar group other than alcoholic hydroxyl group there may be used an ester such as butyl acetate. Other examples of such an organic solvent employable herein include organic solvent with from 1 to 7 carbon number having an alkoxycarbonyl group in molecule such as propyl formate, butyl formate, isobutyl formate, ethyl acetate, propyl acetate, isopropyl acetate, allyl acetate, butyl acetate, isobutyl acetate, pentyl acetate, isopentyl acetate, methyl propionate, ethyl propionate, propyl propionate, methyl acrylate, butyl acrylate, isobutyl acrylate, methyl butyrate, methyl isobutyrate, ethyl butyrate, ethyl isobutyrate, methyl methacrylate, propyl butyrate, isopropyl isobutyrate, 2-ethoxyethyl acetate and 2-(2-ethoxyethoxy)ethyl acetate, singly or in admixture, organic solvent with from 3 to 5 carbon numbers having an ether linkage in molecule such as dipropyl ether, dibutyl ether, ethylene glycol dimethyl ether, ethylene glycol diethyl ether, tripropylene glycol monomethyl ether and tetrahydrofurane, singly or in admixture, organic solvent with from 4 to 8 carbon number having a carbonyl group in molecule such as methyl butyl ketone, methyl isobutyl ketone, methyl hexyl ketone and dipropyl ketone, singly or in admixture, organic solvent with from 1 to 5 carbon number having an amino group in molecule such as isopropylamine, isobutylamine, tertiary butylamine, isopentylamine and diethylamine, singly or in admixture, organic solvent with from 1 to 6 carbon number having a carboxyl group in molecule such as propionic acid, valeric acid, caproic acid and heptoic acid, singly or in admixture, and combination thereof.

In accordance with the present preparation process, the concentration of the polymer electrolyte solution can be properly adjusted to control the open diameter of the pore portion in the porous polymer electrolyte layer, the diameter of the polymer electrolyte constituting the porous polymer electrolyte layer and the porosity of the porous polymer electrolyte layer to a range of from 0.1 to 10 $\mu$m, from 0.1 to 30 $\mu$m and from 10 to 90%, respectively. The thickness of the porous polymer electrolyte layer formed on the surface of the polymer electrolyte layer can be controlled to a range of from 1 to 50 $\mu$m by properly adjusting the amount of the polymer electrolyte solution to be used.

Figure 3:
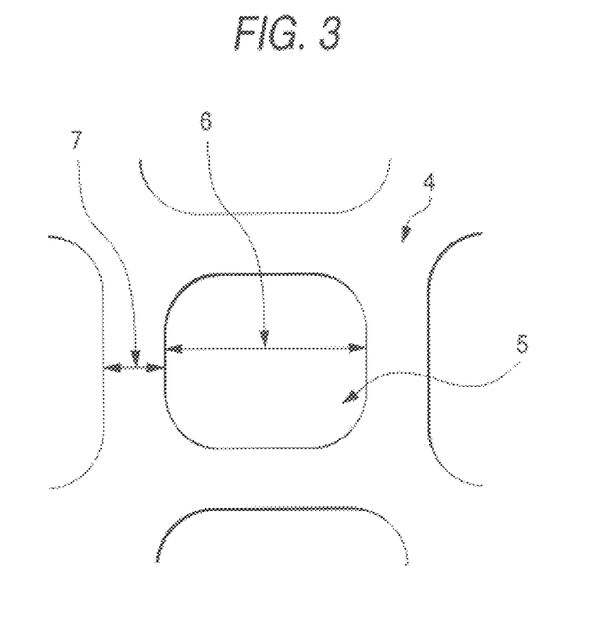
FIG. 3 is a schematic diagram illustrating the basic structure of the surface of a porous polymer electrolyte layer.

FIG. 3 is a schematic diagram illustrating the basic structure of the surface of a porous polymer electrolyte layer. A reference numeral 4 indicates a polymer electrolyte portion. A reference numeral 5 indicates a pore portion. A reference numeral 6 indicates the open diameter of the pore portion. A reference numeral 7 indicates the diameter of the polymer electrolyte portion.

Figure 4:
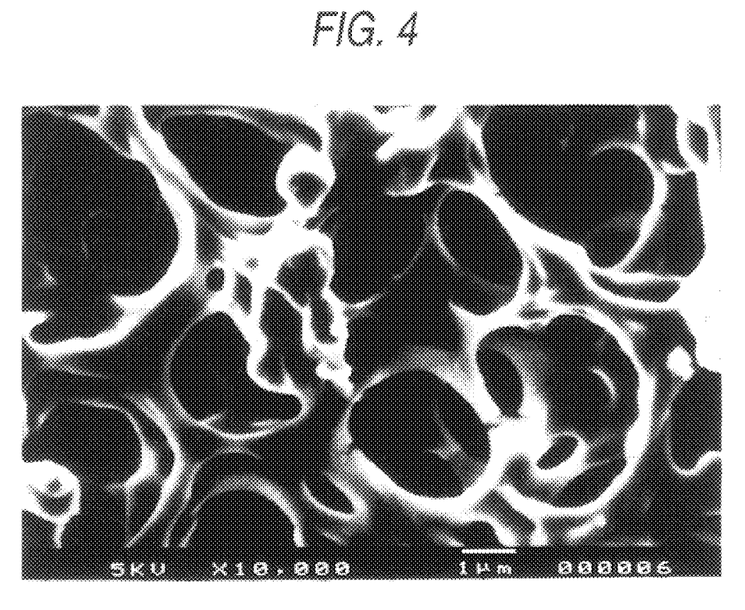
FIG. 4 is an electron microscopephotograph of the surface of a multi-layer polymer electrolyte membrane made from a 13 wt % Nafion solution.

FIG. 4 is an electron microscopephotograph illustrating the surface of a multi-layer polymer electrolyte membrane having a porous polymer electrolyte layer prepared from a 13 wt % Nafion solution. In this example, the open diameter of the pore portion in the porous polymer electrolyte layer is from 0.3 to 5.0 $\mu$m, the diameter of the polymer electrolyte portion in the porous polymer electrolyte layer is from 0.2 to 1.0 $\mu$m, and the porosity of the porous polymer electrolyte layer is 70%.

Figure 5:
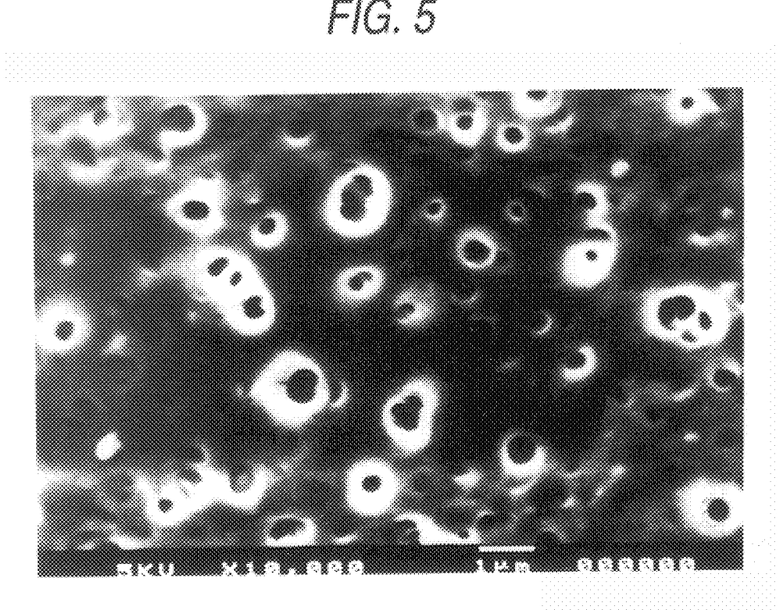
FIG. 5 is an electron microscopephotograph of the surface of a multi-layer polymer electrolyte membrane made from a 23 wt % Nafion solution.

FIG. 5 is an electron microscopephotograph illustrating the surface of a multi-layer polymer electrolyte membrane having a porous polymer electrolyte layer prepared from a 23 wt % Nafion solution. In this example, the open diameter of the pore portion in the porous polymer electrolyte layer is from 0.2 to 0.5 $\mu$m, the diameter of the polymer electrolyte portion in the porous polymer electrolyte layer is from 0.5 to 2.0 $\mu$m, and the porosity of the porous polymer electrolyte layer is 15%.

In accordance with the preparation process of the present invention, the step of forming pores for increasing the surface area of the multi-layer polymer electrolyte membrane is not contaminated such as low molecular organic material as shown in the conventional art. Accordingly, since there is no impurities between the multi-layer polymer electrolyte membrane and the electrode or catalyst layer, it is possible to increase the contact area between them.

Further, the preparation process does not require a treatment such as excessive heating, immersion in a solvent causing the drop of proton conduction or any other. Accordingly, it is possible to prevent the drop of the protonic conduction of the multi-layer polymer electrolyte membrane during preparation. Hence, it is possible to keep the protonic conduction of the multi-layer polymer electrolyte membrane high.

A process for the preparation of a multi-layer polymer electrolyte membrane having the structure assembled plural multi-layer polymer electrolyte membrane according to the present invention will be described hereinafter.

In accordance with the preparation process, a multi-layer polymer electrolyte membrane having the structure assembled plural multi-layer polymer electrolyte membrane is formed by preparing a multi-layer polymer electrolyte membrane with porous polymer electrolyte layer, piling the multi-layer polymer electrolyte membranes and other polymer electrolyte in an arrangement such that they come in contact with the porous polymer electrolyte layer, assembling these layers. The assembly of these layers can be accomplished by heat-pressing the pile.

The pressure and temperature at which pile of membranes the is heat-pressed is preferably determined to fall within the range of from 50 kg/cm$^2$ to 500 kg/cm$^2$ and from 100° C. to 175° C., respectively.

As the polymer electrolyte layer to be assembled on the multi-layer polymer electrolyte membrane having a porous polymer electrolyte layer, there may be used the same material as the multi-layer polymer electrolyte membrane constituting the foregoing porous polymer electrolyte layer. Alternatively, a cast film prepared from a polymer electrolyte solution may be used.

For example, a multi-layer polymer electrolyte membrane with three layers having the structure as shown in FIG. 2 can be prepared by piling polymer electrolyte layer and a polymer electrolyte membrane with two layers having the structure as shown in FIG. 1 prepared by the foregoing process, and then assembling them.

Further, a multi-layer polymer electrolyte membrane with four layers can be prepared by assembling a multi-layer polymer electrolyte membrane having a porous polymer electrolyte layer provided on both surfaces thereof, piling an ordinary multi-layer polymer electrolyte layer on the multi-layer polymer electrolyte membrane, and then assembling them. In this arrangement, this multi-layer polymer electrolyte membrane has an effect increasing the contact area on the surface in addition to high water retention characteristic and a high-performance performance.

Figure 6:
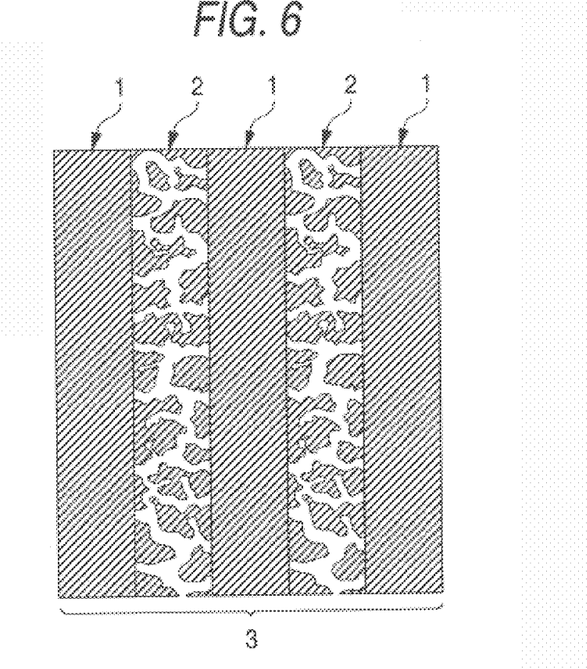
FIG. 6 is a schematic sectional view illustrating another embodiment of the multi-layer polymer electrolyte membrane according to the present invention.

Further, by assembling a multi-layer polymer electrolyte membrane having the structure as shown in FIG. 1 and a multi-layer polymer electrolyte membrane having the structure as shown in FIG. 2 at the area of the porous polymer electrolyte layer, a multi-layer polymer electrolyte membrane can be prepared having a repetition of non-porous polymer electrolyte layer and porous polymer electrolyte layer as shown in FIG. 6.

By thus assembling an arbitrary number of multi-layer polymer electrolyte membranes each having a porous polymer electrolyte layer provided on one surface thereof, a multi-layer polymer electrolyte membrane can be prepared having a repetition structure of non-porous polymer electrolyte layer and porous polymer electrolyte layer.

An electrochemical apparatus having the multi-layer polymer electrolyte membrane according to the present invention will be described hereinafter.

Figure 7:
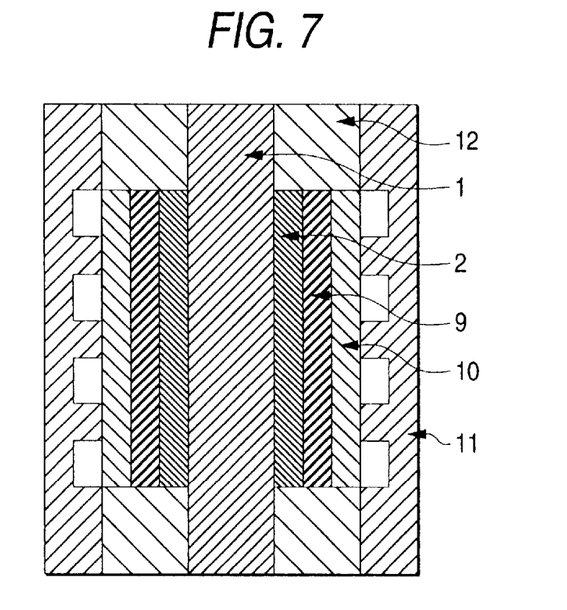
FIG. 7 is a schematic diagram illustrating a section of an embodiment of the solid polymer electrolyte type fuel cell having multi-layer polymer electrolyte membrane according to the present invention.

FIG. 7 is a schematic sectional view of a solid polymer electrolyte type fuel cell having the multi-layer polymer electrolyte membrane of the present invention provided interposed between electrodes. In FIG. 7, the reference numeral 1 indicates a non-porous polymer electrolyte layer.

The reference numeral 2 indicates a porous polymer electrolyte layer formed on the non-porous polymer electrolyte layer 1. A reference numeral 9 indicates a catalyst layer assembled on the other surface of the porous polymer electrolyte layer. The catalyst layer 9 contains at least platinum group metal catalyst particles or a carbon powder having platinum group metal catalyst particles supported thereon as a catalyst. The catalyst layer 9 further has a fluorocarbon resin such as polytetrafluoroethylene (PTFE) included therein as a binder. The catalyst layer 9 may have a polymer electrolyte included therein to enhance the proton conduction thereof. Such a polymer electrolyte included therein also acts as a binder for catalyst. A reference numeral 10 is a diffusion layer assembled on the catalyst layer 9. As the diffusion layer 10 there may be used, e.g., hydrophobic carbon paper. A reference numeral 11 is a separator having an anode or cathode reactant flow ditch formed therein. The separator 11 may be formed by an electrically conductive material impermeable to gas or liquid. As the separator 11 there may be used graphite. A reference numeral 12 indicates a gasket.

Thus, a catalyst layer and a diffusion layer are sequentially assembled on both surfaces of the multi-layer polymer electrolyte membrane of the present invention to prepare a diffusion electrode-polymer electrolyte assembly. The diffusion electrode-polymer electrolyte assembly thus prepared is then sandwiched between a pair of separators each having a flow ditch formed therein to form a single cell for solid polymer electrolyte type fuel cell. An electromotive force is obtained by supplying reactants for cathode and anode in the solid polymer electrolyte type fuel cell, respectively. In this case, the electromotive force of the single cell is not so high as not higher than 1 V. By stacking a plurality of single cells to form a cell stack, a polymer electrolyte type fuel cell having a high electromotive force can be obtained.

Further, the multi-layer polymer electrolyte membrane having a polymer electrolyte layer provided on both surfaces of a porous polymer electrolyte layer as shown in FIG. 2 is suitable particularly for use with a solid polymer electrolyte type fuel cell. In this arrangement, the resulting multi-layer polymer electrolyte membrane exhibits a good water retention. Accordingly, it is possible to supply a fuel and/or oxidizing reagent nonhumidified. The solid polymer electrolyte type fuel cell is preferably operated in this manner.

An embodiment of the water electrolyzer according to the present invention will be described hereinafter.

A circular platinum electrode having a diameter of 3 cm can be formed on both surfaces of a multi-layer polymer electrolyte membrane having a porous polymer electrolyte layer by nonelectrolytic plating method. For example, a polymer electrolyte is immersed in an aqueous solution of platinum-amine complex so that a platinum salt is adsorbed by the polymer electrolyte. The polymer electrolyte is then immersed in a reducing reagent such as aqueous solution of sodium borohydride so that metallic platinum is deposited thereon. A collector and a collector plate are arranged on the respective platinum electrode portion formed on both surfaces of the multi-layer polymer electrolyte membrane. The arrangement is then sandwiched by an end plate from both sides thereof to form a water electrolyzer. As the collector, there may be used expanded titanium. As necessary, expanded titanium plated with platinum may be used. A gasket is arranged around the platinum electrode. As the gasket, there may be used, e.g., silicon sheet. As the collector plate to be arranged on both sides, there may be used a titanium plate. The collector, collector plate and gasket are arranged on both surfaces of the polymer electrolyte on which a platinum electrode has been formed on both surfaces thereof by electroless plating method. The laminate is then sandwiched between a pair of end plates made of, e.g., propylene. The assembly Can then be clamped by a tie bolt to form a water electrolyzer. When a voltage is applied to the two opposing electrodes of the water electrolyzer with water being supplied into the anode and cathode, water is electrolyzed to produce oxygen from the anode and hydrogen from the cathode.

In the water electrolyzer having a multi-layer polymer electrolyte membrane according to the present invention, the area of contact between the multi-layer polymer electrolyte membrane and the platinum electrode is large, producing a large three-phase boundary where the electrode reaction proceeds. Thus, the resulting water electrolyzer exhibits improved characteristics.

An embodiment of the chloro-alkali electrolyzer according to the present invention will be described hereinafter.

An anode and a cathode are assembled to a multi-layer polymer electrolyte membrane having a porous polymer electrolyte layer. As the anode, there may be used, e.g., expanded titanium onto which ruthenium oxide has been pyrolytically coated. As the cathode, there may be used, e.g., expanded SUS304 steel. The multi-layer polymer electrolyte membrane having a porous polymer electrolyte layer with an anode and a cathode provided on the respective surface thereof can be disposed as a separator to form an anode tank and a cathode tank. Thus, a chloro-alkali electrolyzer can be formed. When a voltage is applied to the two opposing electrodes of the chloro-alkali electrolyzer with a 5 N aqueous solution of sodium chloride and water being supplied into the anode tank and the cathode tank, respectively, brine electrolysis can be proceeded.

Then, sodium hydroxide and hydrogen are produced from the cathode and chlorine is produced from the anode.

In the brine electrolyzer having the multi-layer polymer electrolyte membrane of the present invention, pores are formed in the zero clearance between the polymer electrolyte and the electrode. In this arrangement, the aqueous solution of sodium chloride in the anode and the aqueous solution of sodium hydroxide in the cathode can be smoothly diffused even if the clearance between the multi-layer polymer electrolyte membrane and the electrode is zero. Further, chlorine gas produced from the anode and hydrogen gas produced from the cathode can be smoothly diffused. The smooth diffusion of these substances and the arrangement of the zero clearance allow the reduction of the electrolysis voltage, enabling a highly efficient electrolysis.

EXAMPLES

The present invention will be further described in the following examples.

EXAMPLE 1

Figure 8:
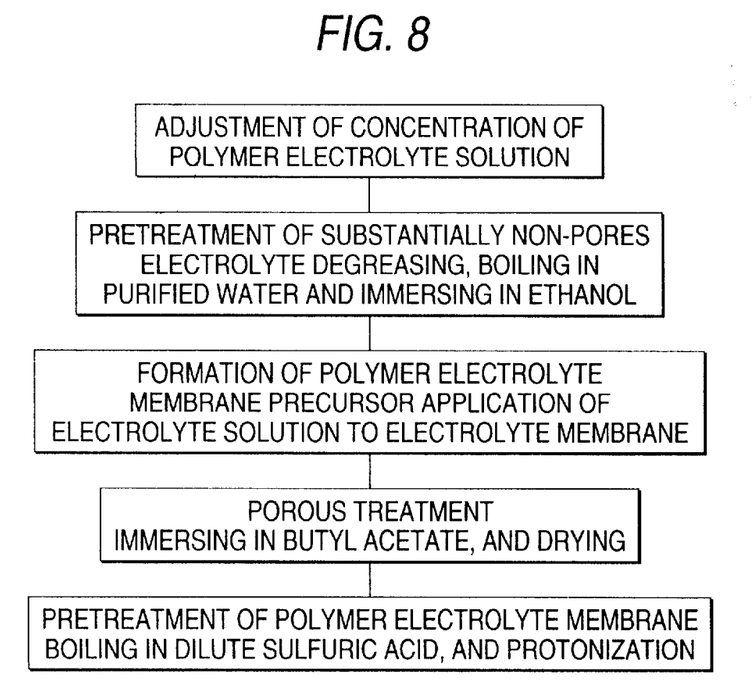
FIG. 8 is a flow chart illustrating an embodiment of the process for the preparation of a multi-layer polymer electrolyte membrane.

FIG. 8 is a flow chart illustrating an embodiment of the process for the preparation of a multi-layer polymer electrolyte membrane having a porous polymer electrolyte layer. The preparation process consists of five steps which will be described hereinafter.

At a first step, the concentration of a polymer electrolyte solution is adjusted. A commercially available 5 wt % Nafion solution was taken in a sample bottle. The solution was then heated to a temperature of 60° C. with stirring so that it was concentrated to 13 wt %.

At a second step, a multi-layer polymer electrolyte membrane is subjected to pretreatment. A commercially available Nafion 115 membrane was washed with purified water three times, boiled in a 3% aqueous solution of hydrogen peroxide for 1 hour so that it was degreased, and then washed again with purified water three times. The membrane thus treated was boiled in purified water for 1 hour, and then transferred into room temperature purified water so that the multi-layer polymer electrolyte membrane had enough water therein. Subsequently, the multi-layer polymer electrolyte membrane was immersed in ethanol for 10 minutes so that Nafion 115 membrane was allowed to swell thoroughly.

At a third step, a multi-layer polymer electrolyte membrane precursor is produced. The multi-layer polymer electrolyte membrane which had been subjected to pretreatment was taken out from ethanol, and then wiped with a filter paper to remove excessive ethanol from the surface of the multi-layer polymer electrolyte membrane. A 13 wt % Nafion solution was spray-coated onto both surfaces of the multi-layer polymer electrolyte membrane so rapidly that the multi-layer polymer electrolyte membrane did not dry to produce a multi-layer polymer electrolyte membrane precursor. The applied amount of the 13 wt % Nafion solution was about 2.4 mg/cm$^2$.

At a fourth step, the multi-layer polymer electrolyte membrane precursor having a porous polymer electrolyte layer is immersed in an organic solvent so that it is rendered porous to form a porous polymer electrolyte layer. The multi-layer polymer electrolyte membrane precursor was immersed in butyl acetate for 10 minutes, taken out from the organic solvent, and then dried at room temperature. As a result, the 13 wt % Nation solution which had been applied to both surfaces of the multi-layer polymer electrolyte membrane became a porous polymer electrolyte layer.

At a fifth step, the multi-layer polymer electrolyte membrane having a porous polymer electrolyte layer is subjected to pretreatment so that the counter ions of polymer electrolyte are rendered proton type. The multi-layer polymer electrolyte membrane having a porous polymer electrolyte layer was washed with purified water three times, and then boiled in a 0.5 M dilute sulfuric acid for 1 hour. Thereafter, the multi-layer polymer electrolyte membrane was washed with purified water five times, and then stored in purified water.

The multi-layer polymer electrolyte membrane having a porous polymer electrolyte layer thus prepared will be hereinafter referred to as "multi-layer polymer electrolyte membrane A".

A process for the preparation of a solid polymer electrolyte type fuel cell having the multi-layer polymer electrolyte membrane A will be described hereinafter.

To 2.6 g of a carbon catalyst having platinum supported thereon in an amount of 30 wt % was added 45 ml of purified water. Subsequently, to the mixture was added gradually 45 ml of 2-propanol with stirring so that the carbon-supported platinum catalyst was dispersed in a mixture of water and 2-propanol. The dispersion thus prepared was then stirred by means of a stirrer for 30 minutes. To the mixture was then gradually added 0.5 ml of a PTFE dispersion (produced by Mitsui Du Pont Fluorochemical Co., Ltd.; PTFE content: 60%) with stirring. The mixture was then stirred for 30 minutes. To the mixture was then gradually added 17.5 ml of a 5 wt % Nafion solution (produced by Aldrich Corp. of US) with stirring. The mixture was then stirred for 30 minutes. Thus, a catalyst dispersion was prepared.

The catalyst dispersion thus prepared was spray-coated onto both surfaces of the multi-layer polymer electrolyte membrane A, and then dried. Thus, a circular catalyst layer having a diameter of 3 cm on the multi-layer polymer electrolyte membrane A was formed. The catalyst layer thus formed had a platinum catalyst content of about 0.5 mg/cm$^2$.

A hydrophobic carbon paper having a diameter of 3 cm as a gas diffusion layer was assembled to both surfaces of the multi-layer polymer electrolyte membrane A having a catalyst layer on the both side of which a catalyst layer had thus been formed by heat-pressing (120 kg/cm$^2$, 135° C., 5 minutes). Thus, a gas diffusion electrode-multi-layer polymer electrolyte membrane assembly A was prepared.

The gas diffusion electrode-multi-layer polymer electrolyte membrane assembly A thus prepared was sandwiched between a pair of metallic separators having a gas flow ditch formed therein to prepare a solid polymer electrolyte type fuel cell A according to the present invention.

The fuel cell thus prepared was operated under the following conditions to measure the current-voltage characteristics thereof. Pure hydrogen was used as the fuel gas. The fuel gas was humidified by a bubbler type humidifier which had been adjusted to a temperature of 60° C. The fuel gas was then supplied into the cell at a rate such that the percent utilization reached 70%. As the oxidant gas, there was used pure oxygen. The oxidant gas was humidified by a bubbler type humidifier which had been adjusted to a temperature of 60° C. The oxidant gas was then supplied into the cell at a rate such that the percent utilization reached 50%. These reactant gases were each supplied into the fuel cell at ambient pressure. A 65° C. coolant was then circulated so that the cell temperature was kept constant.

EXAMPLE 2

A multi-layer polymer electrolyte membrane B was prepared in the same manner as in Example 1 except that a 23 wt % Nafion solution prepared from a 5 wt % Nafion solution as a commercially available perfluorosulfonic acid resin solution was used.

The same catalyst dispersion as prepared in Example 1 was then spray-coated onto both surfaces of the multi-layer polymer electrolyte membrane B. Thus a circular catalyst layer having a diameter of 3 cm was formed thereon. The catalyst layer thus prepared had a platinum catalyst content of about 0.5 mg/cm$^2$.

A phydrophobic carbon paper as a gas diffusion layer was assembled to both surfaces of the multi-layer polymer electrolyte membrane B having catalyst layer on the both surfaces of which a catalyst layer had thus been formed by heating press (120 kg/cm$^2$, 135° C., 5 minutes). Thus, a gas diffusion electrode-multi-layer polymer electrolyte membrane assembly B was prepared.

The gas diffusion electrode-multi-layer polymer electrolyte membrane assembly B thus prepared was sandwiched interposed between a pair of metallic separators having a gas flow ditch formed therein to prepare a solid polymer electrolyte type fuel cell B according to the present invention. The fuel cell thus prepared was then operated under the same conditions as used in Example 1 to measure the current-voltage characteristics thereof.

COMPARATIVE EXAMPLE 1

A Nafion 115 membrane was roughened on both surfaces thereof with a 2000# sanding paper, boiled in a 3% aqueous solution of hydrogen peroxide for 1 hour, and then washed with purified water five times. Subsequently, the membrane thus treated was boiled in a 0.5 M dilute sulfuric acid for 1 hour so that it was rendered proton type, and then washed with purified water five times to prepare a surface-roughened multi-layer polymer electrolyte membrane. The multi-layer polymer electrolyte membrane thus prepared will be hereinafter referred to as "multi-layer polymer electrolyte membrane C".

A solid polymer electrolyte type fuel cell having the multi-layer polymer electrolyte membrane C was then prepared. The same catalyst dispersion as prepared in Example 1 was then spray-coated onto both surfaces of the multi-layer polymer electrolyte membrane C to form a circular catalyst layer having a diameter of 3 cm. The catalyst layer thus prepared had a platinum catalyst content of about 0.5 mg/cm$^2$. A hydrophobic carbon paper which had been cut into a diameter of 3 cm as a gas diffusion layer was assembled to both surfaces of the polymer electrolyte membrane C having a catalyst layer on the both surfaces of which a catalyst layer had thus been formed by heat-pressing (120 kg/cm$^2$, 135° C., 5 minutes) Thus, a gas diffusion electrode-multi-layer polymer electrolyte membrane assembly C was prepared.

The gas diffusion electrode-multi-layer polymer electrolyte membrane assembly C thus prepared was then sandwiched between a pair of metallic separators having a gas flow ditch formed therein to prepare a conventional solid polymer electrolyte type fuel cell C. The fuel cell thus prepared was then operated under the same conditions as used in Example 1 to measure the current-voltage characteristics thereof.

COMPARATIVE EXAMPLE 2

A Nafion 115 membrane was boiled in a 3% aqueous solution of hydrogen peroxide for 1 hour, washed with purified water five times, boiled in a 0.5 M dilute sulfuric acid for 1 hour so that it was rendered proton type, and then washed with purified water five times. The multi-layer polymer electrolyte membrane having a normal surface thus prepared will be hereinafter referred to as "multi-layer polymer electrolyte membrane D".

A solid polymer electrolyte type fuel cell having the multi-layer polymer electrolyte membrane D was then prepared. The same catalyst dispersion as prepared in Example 1 was then spray-coated onto both surfaces of the multi-layer polymer electrolyte membrane D to form a circular catalyst layer having a diameter of 3 cm. The catalyst layer thus prepared had a platinum catalyst content of about 0.5 mg/cm$^2$. A hydrophobic carbon paper which had been cut into a diameter of 3 cm as a gas diffusion layer was then assembled to both surfaces of the multi-layer polymer electrolyte membrane D on the both surfaces of which a catalyst layer had thus been formed by heat pressing (120 kg/cm$^2$, 135° C., 5 minutes). Thus, a gas diffusion electrode-multi-layer polymer electrolyte membrane assembly D was prepared.

The gas diffusion electrode-multi-layer polymer electrolyte membrane assembly D thus prepared was then sandwiched interposed between a pair of metallic separators having a gas flow ditch formed therein to prepare a conventional solid polymer electrolyte type fuel cell D. The fuel cell thus prepared was then operated under the same conditions as used in Example 1 to measure the current-voltage characteristics thereof.

Figure 9:
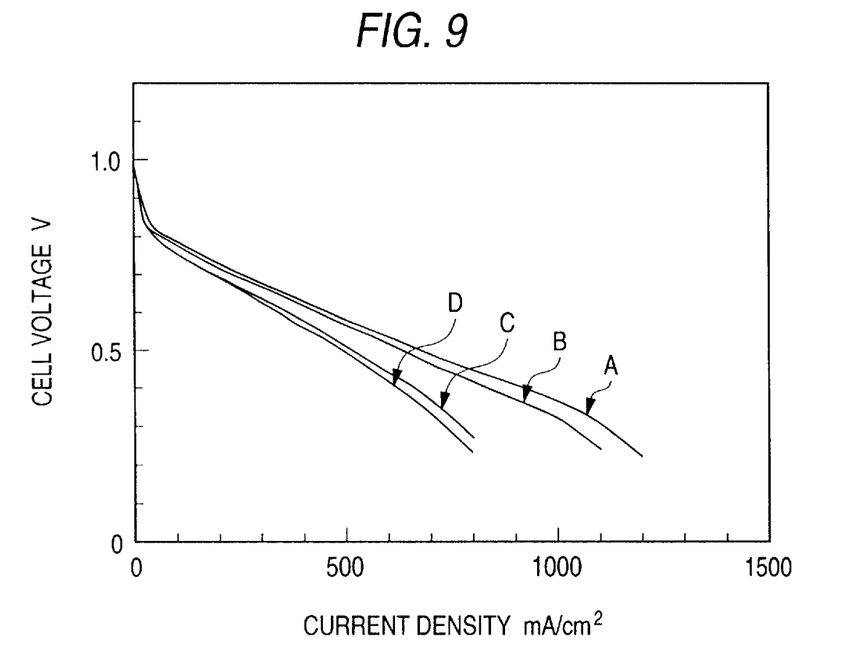
FIG. 9 is a graph illustrating the current-voltage characteristics of the solid polymer electrolyte type fuel cells A, B, C and D.

The current-voltage characteristics of the solid polymer electrolyte type fuel cells A, B, C and D are shown in FIG. 9. As can be seen in FIG. 9, the solid polymer electrolyte type fuel cell C having a multi-layer polymer electrolyte membrane the surface of which had been roughened by sanding shows a lower cell voltage drop at a high current density, generates a higher output power and thus exhibits better characteristics than the solid polymer electrolyte type fuel cell D having an ordinary multi-layer polymer electrolyte membrane having a smooth surface.

On the other hand, it can be seen that the solid polymer electrolyte type fuel cells A and B of the present invention formed from a multi-layer polymer electrolyte membrane having a porous polymer electrolyte layer with three-dimensional network pores generate a higher output power than the solid polymer electrolyte type fuel cells C and D formed from a conventional known polymer electrolyte membrane. It can also be seen that the solid polymer electrolyte type fuel cells A and B of the present invention formed from a multi-layer polymer electrolyte membrane having a porous polymer electrolyte layer with three-dimensional network pores have a great porosity in the porous polymer electrolyte layer formed on the surface of the polymer electrolyte and the solid polymer electrolyte type fuel cell A having the multi-layer polymer electrolyte membrane A, which has a greater surface area than the multi-layer polymer electrolyte membrane B, generates a higher output power and exhibits better characteristics than the solid polymer electrolyte type fuel cell B. The surface of the multi-layer polymer electrolyte membranes A and B is a porous polymer electrolyte layer with three-dimensional network pores. Thus, the area of contact between the polymer electrolyte and the catalyst layer is increased, resulting in the increase in the substantial reaction area. This is presumably a mechanism of improvement of the characteristics of the cell. It is thus concluded that the multi-layer polymer electrolyte membrane of the present invention exerts an effect of enhancing the output power of a solid polymer electrolyte type fuel cell.

EXAMPLE 3

A direct methanol type fuel cell having the same multi-layer polymer electrolyte membrane A as prepared in Example 1 was prepared. In some detail, 3 g of platinum black was dispersed in 50 ml of purified water. To the dispersion was then added 5.3 ml of a 5 wt % Nafion solution. The dispersion was then stirred for 30 minutes to prepare an ink-like catalyst dispersion. The ink-like catalyst dispersion thus prepared will be hereinafter referred to as "catalyst dispersion P". Subsequently, 3 g of Pt-RuOx (Pt:R=1:1) was dispersed in 50 ml of purified water. To the dispersion thus prepared was then added 12.5 ml of a 5 wt % Nafion solution. The dispersion was then stirred for 30 minutes to prepare an ink-like catalyst dispersion. The ink-like catalyst dispersion thus prepared will be hereinafter referred to as "catalyst dispersion R". The catalyst dispersion P was spray-coated onto one surface of the multi-layer polymer electrolyte membrane A having a porous polymer electrolyte layer with three-dimensional network pores, and then dried to form a circular cathode catalyst layer having a diameter of 3 cm. The cathode catalyst layer thus formed had a platinum content of about 2.5 mg/cm$^2$.

The catalyst dispersion R was spray-coated onto the other surface of the multi-layer polymer electrolyte membrane A, and then dried to form a circular anode catalyst layer having a diameter of 3 cm. The anode catalyst layer thus formed had a platinum content of about 2.0 mg/cm$^2$. A carbon paper was then assembled to both surfaces of the multi-layer polymer electrolyte membrane A having an anode and a cathode formed on the respective surface thereof by heating press (120 kg/cm$^2$, 135° C., 5 minutes). Thus, a diffusion electrode-multi-layer polymer electrolyte membrane assembly E was prepared.

The gas diffusion electrode-multi-layer polymer electrolyte membrane assembly E thus prepared was then sandwiched between a pair of metallic separators having a gas flow ditch formed therein to prepare a direct methanol type fuel cell E according to the present invention.

The fuel cell thus prepared was then operated under the following conditions to measure the current-voltage characteristics thereof. In operation, oxygen which had been pressed to 3 atm was supplied into the cathode while a 1 M methanol/water mixture which had been pressed to 2 atm was supplied into the anode. A 110° C. coolant was circulated so that the cell temperature was kept constant.

COMPARATIVE EXAMPLE 3

A direct methanol type fuel cell having the same multi-layer polymer electrolyte membrane D as prepared in comparative Example 2 was prepared. In some detail, the same catalyst dispersion P as prepared in Example 3 was spray-coated onto one surface of the multi-layer polymer electrolyte membrane D, and then dried to form a cathode catalyst layer having a diameter of 3 cm. The cathode catalyst layer thus formed had a platinum content of about 2.5 mg/cm$^2$. The same catalyst dispersion R as prepared in Example 3 was spray-coated onto the other surface of the multi-layer polymer electrolyte membrane D, and then dried to form a circular anode catalyst layer having a diameter of 3 cm. The anode catalyst layer thus formed had a platinum content of about 2.0 mg/cm$^2$. A carbon paper was then assembled to both surfaces of the multi-layer polymer electrolyte membrane D having an anode and a cathode formed on the respective surface thereof by heat-pressing (120 kg/cm$^2$, 135° C., 5 minutes). Thus, a diffusion electrode-polymer electrolyte membrane assembly F was prepared.

The gas diffusion electrode-multi-layer polymer electrolyte membrane assembly F thus prepared was then sandwiched between a pair of metallic separators having a gas flow ditch formed therein to prepare a direct methanol type fuel cell F. The fuel cell thus prepared was then operated under the same conditions as used in Example 3 to measure the current-voltage characteristics thereof.

Figure 10:
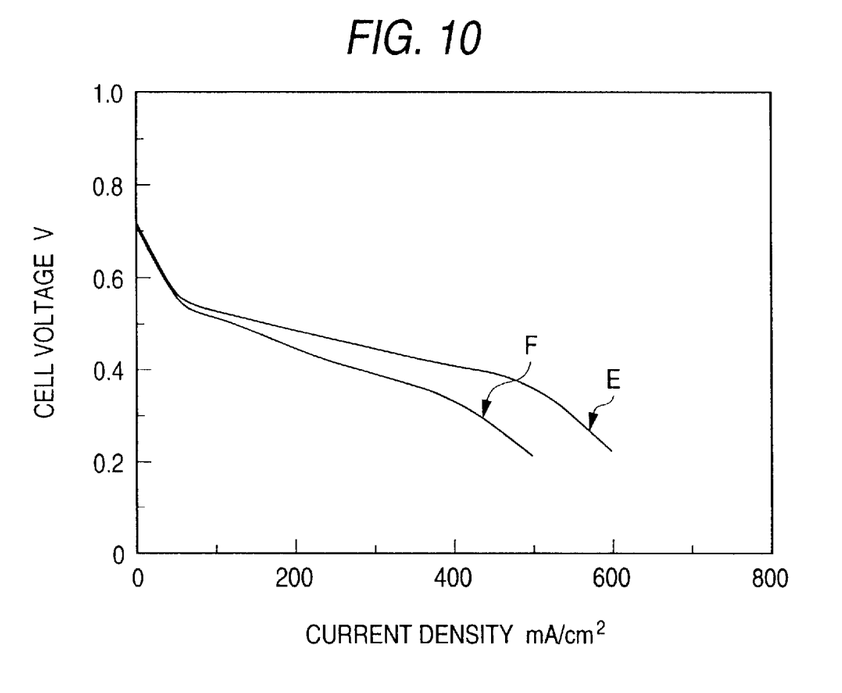
FIG. 10 is a graph illustrating the current-voltage characteristics of the direct methanol type fuel cells E and F.

The current-voltage characteristics of the direct methanol type fuel cells E and F are shown in FIG. 10. As can be seen in FIG. 10, the direct methanol type fuel cell E having a multi-layer polymer electrolyte membrane of the present invention generates a higher output power and thus exhibits better characteristics than the direct methanol type fuel cell F having a conventional known multi-layer polymer electrolyte membrane. The surface of the multi-layer polymer electrolyte membrane constituting the direct methanol type fuel cell E is a porous polymer electrolyte layer with three-dimensional network pores. Thus, the area of contact between the catalyst layer in the cathode or anode and the multi-layer polymer electrolyte membrane is increased, resulting in the increase in the substantial reaction area. This is presumably a mechanism of improvement of the characteristics of the cell. It can be thus seen that the multi-layer polymer electrolyte membrane of the present invention exerts an effect of enhancing the output power of a direct methanol type fuel cell.

EXAMPLE 4

An example of the process for the preparation of the multi-layer polymer electrolyte membrane of the present invention having a multi-layer polymer electrolyte layer provided on both surfaces of a porous polymer electrolyte layer.

Figure 11:
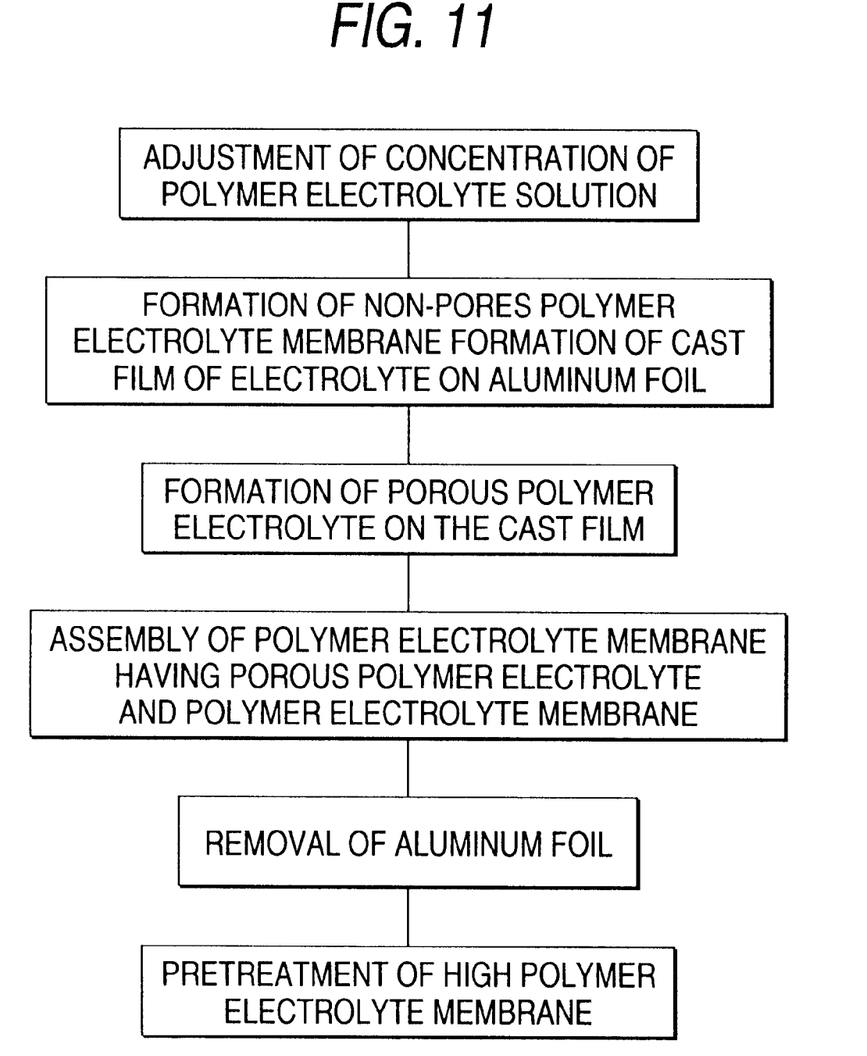
FIG. 11 is a flow chart illustrating another embodiment of the process for the preparation of a multi-layer polymer electrolyte membrane.

FIG. 11 is a flow chart illustrating an embodiment of the process for the preparation of a multi-layer polymer electrolyte membrane. The preparation process consists of six steps which will be described hereinafter.

At a first step, the concentration of a polymer electrolyte solution is adjusted. A commercially available 5 wt % Nafion solution was taken in a sample bottle. The solution was then heated to a temperature of 60° C. with stirring so that it was concentrated to 16 wt %.

At a second step, a cast film of polymer electrolyte is formed by the Nafion solution thus concentrated. The 16 wt % Nafion solution was applied to an aluminum foil by means of a doctor blade the gap of which had been adjusted to 0.33 mm, and then dried to form a cast film of Nafion. The thickness of the cast film was then measured. The results were about 22 $\mu$m. The cast film thus formed will be hereinafter referred to as "polymer electrolyte membrane A1".

At a third step, a porous polymer electrolyte layer with three-dimensional network pores was formed on one surface of the multi-layer polymer electrolyte membrane A1. The 16 wt % Nafion solution was applied to the polymer electrolyte membrane A1 on an aluminum foil prepared at the second step by means of a doctor blade the gap of which had been adjusted to 0.16 mm. The coated material was immersed in butyl acetate for 10 minutes, and then dried at room temperature to form a porous polymer electrolyte layer with three-dimensional network pores on the surface of the polymer electrolyte membrane A1 formed on an aluminum foil. The resulting multi-layer polymer electrolyte membrane will be hereinafter referred to as "multi-layer polymer electrolyte membrane A2". The thickness of the porous polymer electrolyte layer thus formed was about 17 $\mu$m.

At a fourth step, two sheets of the multi-layer polymer electrolyte membranes each having a porous polymer electrolyte layer formed on one surface thereof are assembled to each other. Two sheets of the multi-layer polymer electrolyte membranes A2 formed on an aluminum foil were piled on each other in an arrangement such that the porous polymer electrolyte layers were opposed to each other. The pile thus formed was then mounted on a press tool. In this manner, the pile was pressed at a pressure of 100 kg/cm$^2$ and a temperature of 125° C. for 3 minutes so that two sheets of the multi-layer polymer electrolyte membranes A2 were assembled to each other.

At a fifth step, the aluminum foil is removed from the assembly of multi-layer polymer electrolyte membranes. An aluminum foil was left on both surfaces of the assembly of multi-layer polymer electrolyte membranes formed at the fourth step. The laminate of multi-layer polymer electrolyte membranes was immersed in a 0.5 M dilute sulfuric acid to dissolve the aluminum foil away.

The thickness of the multi-layer polymer electrolyte membrane thus prepared was about 59 $\mu$m in hydrous state.

At a sixth step, the multi-layer polymer electrolyte membrane thus prepared is subjected to pretreatment. The multi-layer polymer electrolyte membrane thus prepared was boiled in a 0.5 M dilute sulfuric acid for 1 hour, and then washed with purified water five times. The multi-layer polymer electrolyte membrane thus treated was rendered proton type, and then stored in purified water.

The multi-layer polymer electrolyte membrane thus prepared will be hereinafter referred to as "multi-layer polymer electrolyte membrane G".

A solid polymer electrolyte type fuel cell having the multi-layer polymer electrolyte membrane G was prepared in the following manner.

To 2.6 g of a carbon catalyst having platinum supported thereon in an amount of 30 wt % was added 45 ml of purified water. Subsequently, to the mixture was added gradually 45 ml of 2-propanol with stirring so that the carbon-supported platinum catalyst was dispersed in a mixture of water and 2-propanol. The dispersion thus prepared was then stirred by means of a stirrer for 30 minutes. To the mixture was then gradually added 0.5 ml of a PTFE dispersion (produced by Mitsui Du Pont Fluorochemical Co., Ltd.; PTFE content: 60%) with stirring. The mixture was then stirred for 30 minutes. To the mixture was then gradually added 17.5 ml of a 5 wt % Nafion solution (produced by Aldrich Corp. of US) with stirring. The mixture was then stirred for 30 minutes. Thus, a catalyst dispersion was prepared.

The catalyst dispersion thus prepared was spray-coated onto both surfaces of the multi-layer polymer electrolyte membrane G, and then dried to form a circular catalyst layer having a diameter of 3 cm on the multi-layer polymer electrolyte membrane G. The catalyst layer thus formed had a platinum catalyst content of about 0.5 mg/cm$^2$.

A hydrophobic carbon paper having a diameter of 3 cm as a gas diffusion layer was then assembled to both surfaces of the multi-layer polymer electrolyte membrane G on the both surfaces of which a catalyst layer had thus been formed by heating press (120 kg/cm$^2$, 135° C., 5 minutes). Thus, a gas diffusion electrode-multi-layer polymer electrolyte membrane assembly G was prepared.

The gas diffusion electrode-multi-layer polymer electrolyte membrane assembly G thus prepared was then sandwiched between a pair of metallic separators having a gas flow ditch formed therein to prepare a solid polymer electrolyte type fuel cell G according to the present invention.

The solid polymer electrolyte type fuel cell thus prepared was operated under the following conditions to measure the current-voltage characteristics thereof. As the fuel gas there was used pure hydrogen. The fuel gas was then supplied into the cell at a flow rate such that the percent utilization reached 70%. As the oxidizing gas there was used pure oxygen. The oxidizing gas was then supplied into the cell at a flow rate such that the percent utilization reached 50%. These reactantive gases, i.e., oxygen and hydrogen were each supplied into the cell at ambient pressure. None of these gases was humidified. A 65° C. coolant was then circulated in the fuel cell so that the cell temperature was kept constant.

COMPARATIVE EXAMPLE 4

A commercially available Nafion 115 membrane was washed with purified water three times, boiled in a 3% aqueous solution of hydrogen peroxide for 1 hour, and then washed with purified water five times. The membrane thus treated was boiled in a 0.5 M dilute sulfuric acid for 1 hour, and then washed with purified water five times. The polymer electrolyte membrane thus prepared will be hereinafter referred to as "polymer electrolyte membrane H".

A solid polymer electrolyte type fuel cell having the polymer electrolyte membrane H thus prepared was then prepared in the following manner.

The same catalyst dispersion as prepared in Example 4 was spray-coated onto both surfaces of the polymer electrolyte membrane H, and then dried to form a circular catalyst layer having a diameter of 3 cm on the polymer electrolyte membrane H. The catalyst layer thus formed had a platinum catalyst content of about 0.5 mg/cm$^2$.

A hydrophobic carbon paper having a diameter of 3 cm as a gas diffusion layer was then assembled to both surfaces of the polymer electrolyte membrane H on the both surfaces of which a catalyst layer had thus been formed by heat-pressing (120 kg/cm$^2$, 135° C., 5 minutes). Thus, a gas diffusion electrode-multi-layer polymer electrolyte membrane assembly H was prepared.

The gas diffusion electrode polymer electrolyte membrane laminate H thus prepared was then sandwiched between a pair of metallic separators having a gas flow ditch formed therein to prepare a solid polymer electrolyte type fuel cell H according to the present invention.

The solid polymer electrolyte type fuel cell H thus prepared was operated under the same conditions as used in Example 4 to measure the current-voltage characteristics thereof.

Figure 12:
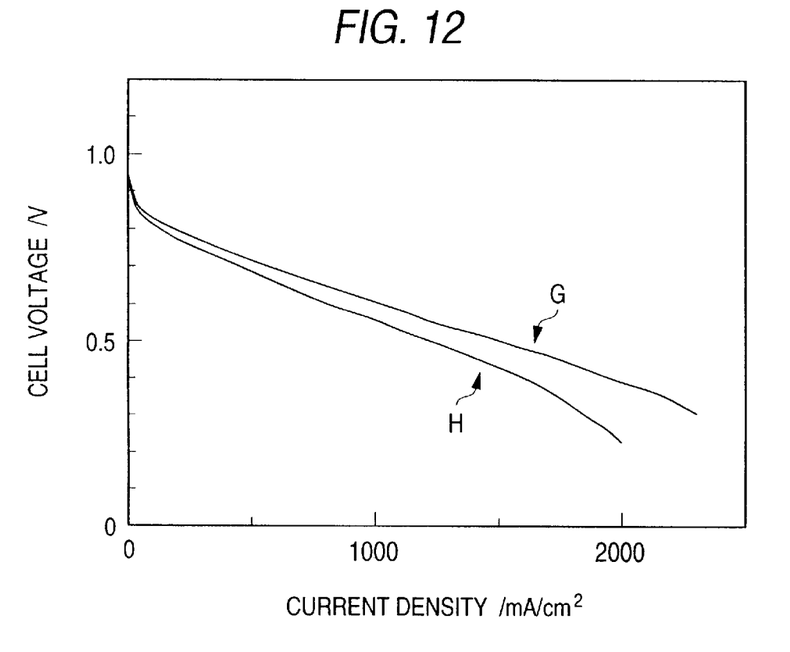
FIG. 12 is a graph illustrating the current-voltage characteristics of the solid polymer electrolyte type fuel cells G and H.

The current-voltage characteristics of the solid polymer electrolyte type fuel cells G and H are shown in FIG. 12. As can be seen in FIG. 12, the solid polymer electrolyte type fuel cell G having a multi-layer polymer electrolyte membrane of the present invention exhibits a higher cell voltage than the solid polymer electrolyte type fuel cell H having an ordinary polymer electrolyte membrane. Although the solid polymer electrolyte type fuel cell G having a multi-layer polymer electrolyte membrane of the present invention provided on both surfaces thereof operates with the reactive gases nonhumidified, it can generate a high output power.

Figure 13:
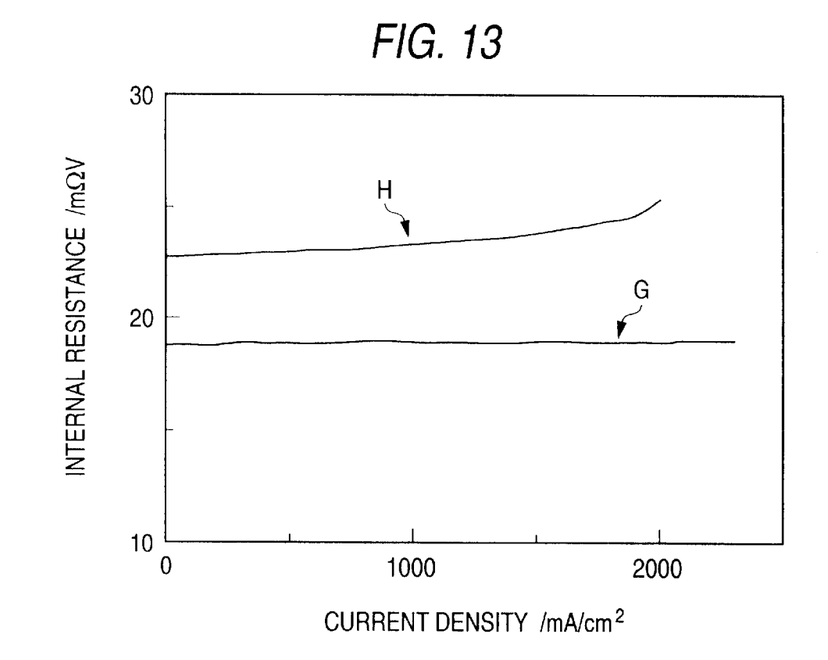
FIG. 13 is a graph illustrating the relationship between current and internal resistance.

Using an internal resistance meter (TSURUGA MODEL 3652), these solid polymer electrolyte type fuel cells were measured for internal resistance in operation. The relationship between current and internal resistance is shown in FIG. 13. The solid polymer electrolyte type fuel cell H shows an increase of internal resistance with an increase of current while the solid polymer electrolyte type fuel cell G shows little or no increase of internal resistance with an increase of current. The multi-layer polymer electrolyte membrane constituting the solid polymer electrolyte type fuel cell G retains water in the pores of the porous polymer electrolyte layer with three-dimensional network pores. Thus a water content of the multi-layer electrolyte membrane was improved. This improvement seems to inhibit the increase of the resistance of the multi-layer polymer electrolyte membrane due to the decrease of the water content of the multi-layer polymer electrolyte membrane.

In other words, the use of the multi-layer polymer electrolyte membrane structure allows the enhancement of the water retention of the polymer electrolyte membrane. Thus, it is possible to decrease the resistive overvoltage due to the decrease of the resistance of the multi-layer polymer electrolyte membrane and provide a solid polymer electrolyte type fuel cell which can stably operate even if a fuel gas and an oxidizing gas are supplied nonhumidified.

In accordance with the first aspect of the present invention the surface area of the polymer electrolyte membrane can be increased and a water retention of the polymer electrolyte membrane can be improved. Further, in accordance with the second aspect of the present invention, a water retention of the polymer electrolyte membrane can be further improved.

In accordance with the electrochemical apparatus according to the present invention, the area between contact of the multi-layer polymer electrolyte membrane and the electrode or catalyst layer is increased, resulting in the increase of the substantial reaction area. Therefore, the efficiency of the apparatus can be enhanced. Further, the output power density of a solid polymer electrolyte type fuel cell or direct methanol type fuel cell and the efficiency of a water electrolyzer can be enhanced. The diffusion of liquid or gas with the clearance between the multi-layer polymer electrolyte membrane and the electrode being zero can be improved. Accordingly, a brine electrolyzer having a high efficiency of energy conversion can be provided.

Further, in accordance with the electrochemical apparatus having the multi-layer polymer electrolyte membrane according to the second aspect of the present invention, the deterioration of performance due to the increase of resistance of polymer electrolyte membrane in operation can be inhibited. In particular, if the electrochemical apparatus is a solid polymer electrolyte type fuel cell, the increase of the membrane resistance due to the reduction of the water content of the multi-layer polymer electrolyte membrane can be inhibited even if the fuel cell is operated with the reactive gases being supplied nonhumidified. The resulting solid polymer electrolyte type fuel cell exhibits a lowered resistive overvoltage and thus fuel cell having high power density can be obtained.

What is claimed is:

1. A multi-layer proton-conductive polymer electrolyte membrane comprising:

a non-porous polymer electrolyte layer; and a porous polymer electrolyte layer, wherein the porous polymer electrolyte layer has polymer electrolyte with three-dimensional network pores and the porous polymer electrolyte layer is provided on the nonporous polymer electrolyte layer, and wherein the pores contain substantially no polymeric materials.

2. A polymer electrolyte fuel cell comprising: two electrodes; and the multi-layer proton-conductive polymer electrolyte membrane as defined in claim 1 provided between the two electrodes.

3. A multi-layer proton-conductive polymer electrolyte membrane comprising:

a non-porous polymer electrolyte layer; and a porous polymer electrolyte layer, wherein the porous polymer electrolyte layer has polymer electrolyte with three-dimensional network pores and the non-porous polymer electrolyte layers are provided on both sides of the porous polymer electrolyte layer, and wherein the pores contain substantially no polymeric materials.

4. An electrochemical apparatus comprising said multi-layer proton-conductive polymer electrolyte membrane as defined in claim 1 or 3 between electrodes.

5. A polymer electrolyte fuel cell comprising said multi-layer proton-conductive polymer electrolyte membrane as defined in claim 2 between electrodes.

a polymer electrolyte layer provided on each of opposite side of the porous polymer electrolyte layer with three-dimension network pores.

6. A multi-layer proton-conductive polymer electrolyte membrane comprising:

a porous polymer electrolyte layer; and a non-porous polymer electrolyte layer provided on each of opposite sides of the porous polymer electrolyte layer, wherein the porous polymer electrolyte layer has polymer electrolyte with three-dimensional network pores, and wherein the pores contain substantially no polymeric materials.

7. A polymer electrolyte fuel cell comprising:

two electrodes; and the multi-layer proton-conductive polymer electrolyte membrane as defined in claim 6 provided between electrodes.

8. A multi-layer proton-conductive polymer electrolyte membrane comprising: a non-porous polymer electrolyte layer; and a porous polymer electrolyte layer with three-dimensional network pores, wherein the porous polymer electrolyte layers are provided on both sides of the non-porous polymer electrolyte layer.

9. A polymer electrolyte fuel cell comprising: two electrodes; and the multi-layer proton-conductive polymer electrolyte membrane as defined in claim 8 provided between the two electrodes.

* * * * *

UNITED STATES PATENT AND TRADEMARK OFFICE
CERTIFICATE OF CORRECTION

PATENT NO. : 6,562,446 B1
DATED : May 13, 2003
INVENTOR(S) : Kazuhide Totsuka

It is certified that error appears in the above-identified patent and that said Letters Patent is hereby corrected as shown below:

<u>Title page,</u>
Item [22], Filed; change "Oct. 20, 1999" to -- Aug. 5, 1999 --.

<u>Column 20,</u>
Line 37, change "claim 2" to -- claim 3 --; and
Lines 38-40, delete "a polymer electrolyte layer provided on each of opposite side of the porous polymer electrolyte layer with three-dimension network pores."

Signed and Sealed this

Thirtieth Day of September, 2003

JAMES E. ROGAN
*Director of the United States Patent and Trademark Office*